May 10, 1932. L. H. DAVIS 1,857,361

DOUGH MIXING MACHINE

Filed Nov. 24, 1928

Inventor:
LOUIS HENRY DAVIS
By Fisher, Clapp, Soans & Pond Attys.

Patented May 10, 1932

1,857,361

UNITED STATES PATENT OFFICE

LOUIS HENRY DAVIS, OF URBANA, ILLINOIS

DOUGH MIXING MACHINE

Application filed November 24, 1928. Serial No. 321,564.

The present invention has relation to that class of dough-mixing machines in which there is mounted within the mixing chamber a revoluble agitator frame adapted to mix the ingredients of the dough, and thereafter to work or knead the dough until it reaches the proper consistency or proper character for baking.

An example of this type of dough-mixing machine is shown in United States Patent No. 1,537,259, Notz and Royan, May 12, 1925.

Figure 1:
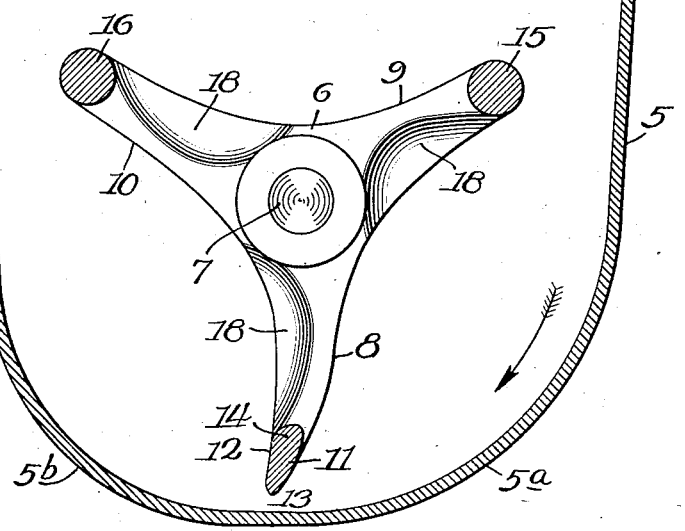
Figure 1 is a view in vertical section on line 1—1 of Figure 2, through the mixing chamber and agitator frame of a machine embodying my invention.
Figure 2:
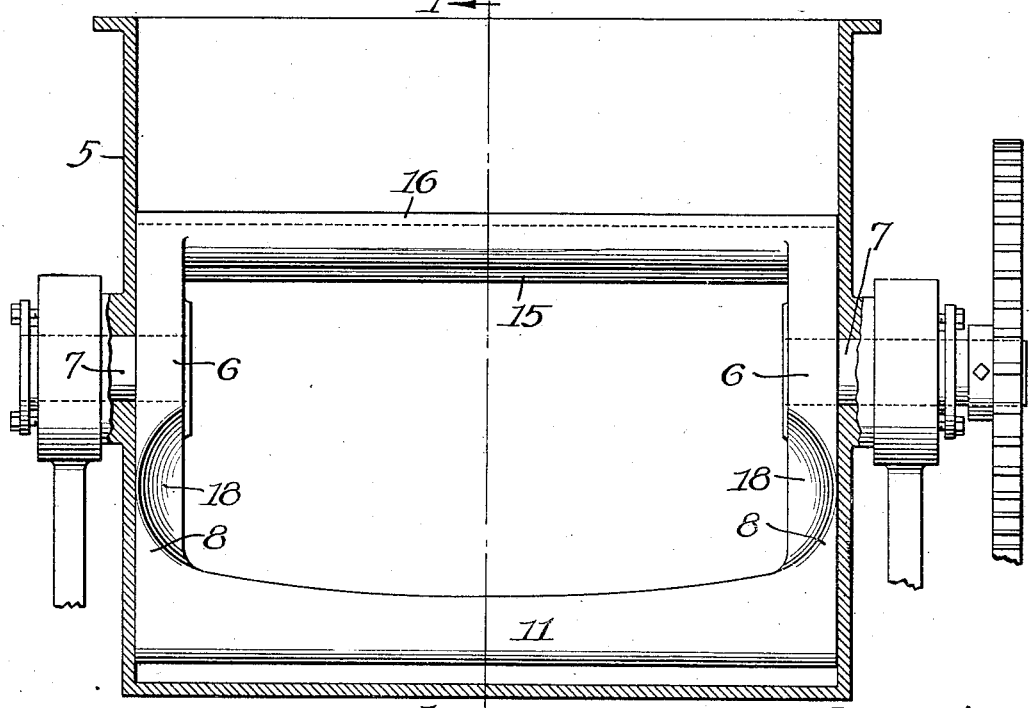
Figure 2 is a view in vertical longitudinal section through the mixing chamber, the agitator frame being shown in side elevation.

My invention consists in the features of novelty hereinafter described, illustrated in the accompanying drawings and particularly pointed out in the claims at the end of the specification.

Referring to the drawings, 5 designates the mixing chamber in which the agitator frame is revolubly mounted. As shown, the agitator frame comprises end members 6 preferably in the form of "spiders", from the hubs of which project the stub shafts 7 that are journaled in suitable bearings in the end walls of the mixing chamber. Rev- from end to end, its outer edge portion 13 is rounded and its inner edge portion 14 is also rounded and somewhat thicker than the outer portion of the blade. The arms 8 carrying the spreader blade 11 are of such length that the working edge 13 of this blade shall travel in close proximity to the curved bottom wall $5^a$ of the mixing chamber, and, in practice, it is found desirable that the distance of the working edge of the spreader blade 11 from the curved wall $5^a$ should be approximately one inch.

The arms 9 of the agitator frame are considerably shorter than the arms 8, and between the ends of these arms 9 extends a round rod 15 that is fixed to the arms 9. The length of the arms 9 is such that the rod 15 extending between such arms shall travel at a greater distance from the curved wall $5^a$ of the mixing chamber, and in practice it is found advantageous that the rod 15 should travel about three inches from the inner face of the curved wall $5^a$ of the mixing chamber 5.

Between the outer ends of the arms 10 of the agitator frame extends the round rod 16 that is similar to the rod 15; but the length of the arms 10 is somewhat greater than the length of the arms 9, so that the rods 16, as the agitator frame revolves, will travel nearer to the inner surface of the curved bottom $5^a$ of the mixing chamber than does the rod 15. Preferably, the rod 16 will travel about two The rods 15 and 16 are long round rods, and in machines of say three-barrel capacity are preferably about four inches in diameter.

As shown, each of the arms 8, 9 and 10 has its inner face formed with an inclined or concave working surface 18, the function of these inclined or concave surfaces 18 being the same as in like surfaces in the arms of the agitator shown in Letters Patent No. 1,537,259 above mentioned.

Preferably, the blade 11 and the rods 15 and 16 are spaced as indicated in the drawings, i. e., about 120 degrees apart.

From the foregoing description, the operation of my improved agitator frame will be seen to be as follows: When the ingredients to be mixed have been placed within the mixing chamber, revolution will be imparted to the agitator frame in the direction of the arrow, Figure 1. At the outset, the blade 11 and the rods 15 and 16 serve to thoroughly agitate and mix the ingredients of which the dough is to be formed, this being more effectively accomplished because of the fact that the blade and the rods travel in different circular paths through the ingredients, and because the action of the blade tends also to lift and carry forward successive portions of the mass until they drop from the back edge of the blade towards the bottom of the mixing chamber.

As the ingredients form into a plastic mass, the spreader blade, in its forward and upward movement, lifts a portion of the mass toward the top of the mixing chamber, while portions of the mass fall downward over the inner edge of the blade and the lifted portions are thrown by the blade against the rear wall of the mixing chamber. The spreader blade 11 as it traverses the rear wall passes through portions of the plastic mass that have been thrown against such wall and also spreads and stretches portions of such mass as the blade moves in its downward path.

The rod 15, following the blade 11 at a considerably greater distance from the wall of the mixing chamber, bears upon the mass of dough that has passed over the inner edge of the blade 11 and stretches and spreads this mass in a sheet upon the thinner sheet left by the blade 11 on the bottom wall 5ª of the chamber 5, portions of the dough also passing rearwardly over the rod 15 as it moves forwardly and upwardly.

The rod 16 following the rod 15, but in a path at less distance from the wall 5ª, in like manner stretches and spreads the mass of dough upon the sheets that have been formed by the blade 11 and rod 15, while allowing portions of the mass to pass over its inner surface as the rod 16 moves forwardly and upwardly. The action of the scraper or spreader blade and rods on the dough may be further described as being a continuous kneading, and a continuous turning or folding and rolling or stretching action. The rods 15 and 16 serve mainly to roll or stretch the dough in layer form on the wall of the mixing chamber, while the scraper or spreader blade 11 serves to collect or gather and carry upwardly a large quantity of the dough in the chamber, some of the dough falling over the inside of the blade and dropping to the bottom of the mixing chamber, whereby it is more or less folded or turned, while the dough which clings to the blade is slapped against the rear wall of the chamber and thereby, in effect, kneaded. This operation, thus briefly outlined, is repeated at each revolution of the blade and rod. Inasmuch as the central portion of the agitator frame is unobstructed by any through shaft or the like, no obstacle is presented to the backward falling of the mass of dough over the inner portion of the blade 11 and rods 15 and 16. The inclined or concave surfaces 18 of the arms 8, 9 and 10 serve to move the mass of dough inwardly towards the center and so prevent any tendency of the dough to accumulate about the ends of the agitator frame.

By reference to Figure 1 of the drawings, it will be seen that at its lower portion the front wall of the mixing chamber is formed with a slightly bulged or eccentric portion 5ᵇ. By thus bulging the front wall of the mixing chamber as at 5ᵇ, there is provided a pocket or space to receive a portion of the dough that is being carried forward by the spreader blade 11 and rods 15 and 16, such portion of the dough falling over the front or working faces of the blade and rods. The dough thus accumulating in the pocket 5ᵇ is, of course, picked up by the blade and rods as they successively pass across the pocket 5ᵇ of the chamber.

While it is difficult to describe with exactness the precise action of the spreader blade 11 and rods 15 and 16 upon the mass of dough, in practice it is found that the spreader blade and rods, because of the construction and arrangement shown, serve most effectively to stretch, fold and knead the mass of dough.

While I have described what I regard as the preferred embodiment of my invention, it is manifest that the precise details above set forth may be varied without departure from the scope of the invention as defined in the following claims.

What I claim as new, and desire to secure by Letters Patent, is:

1. In a dough-mixing machine, the combination with a mixing chamber of an agitator frame revolubly mounted therein and comprising end members, a plurality of straight rods extending between said end members, said rods being parallel with the axis of the agitator frame and at different distances from said axis, and a spreader blade also extending between said end members parallel to the axis of the agitator frame and further from said axis than are said rods, the rod immediately following said spreader blade being arranged to travel in a path nearer the axis of the agitator frame than the path of travel of the rod immediately preceding said spreader blade.

2. In a dough mixing machine, the combination of a mixing chamber, and an agitator frame revolubly mounted therein and comprising end members, a plurality of rods extending between said end members, said rods being located at different distances from the axis of said agitator frame, and a spreader blade also extending between said end members and located further from said axis than are said rods, the rod immediately following said spreader blade being arranged to travel in a path nearer the axis of the agitator frame than the path of travel of the rod immediately preceding said spreader blade.

November 17, 1928.

LOUIS HENRY DAVIS.